United States Patent
Meyer et al.

(10) Patent No.: US 12,509,788 B2
(45) Date of Patent: Dec. 30, 2025

(54) SYSTEM AND METHOD FOR COLLECTING AND PRE-TREATING PROCESS GASES GENERATED BY AN ELECTROLYSIS CELL

(71) Applicant: ELYSIS LIMITED PARTNERSHIP, Montreal (CA)

(72) Inventors: Michel Meyer, La Tour-en Maurienne (FR); Roy A. Glisan, Cranberry Township, PA (US)

(73) Assignee: ELYSIS LIMITED PARTNERSHIP, Montreal (CA)

( * ) Notice: Subject to any disclaimer, the term of this patent is extended or adjusted under 35 U.S.C. 154(b) by 495 days.

(21) Appl. No.: 17/440,086

(22) PCT Filed: Mar. 19, 2020

(86) PCT No.: PCT/CA2020/050363
§ 371 (c)(1),
(2) Date: Sep. 16, 2021

(87) PCT Pub. No.: WO2020/186354
PCT Pub. Date: Sep. 24, 2020

(65) Prior Publication Data
US 2022/0186393 A1 Jun. 16, 2022

Related U.S. Application Data

(60) Provisional application No. 62/820,917, filed on Mar. 20, 2019.

(51) Int. Cl.
*C25C 3/22* (2006.01)
*C25C 3/08* (2006.01)
*C25C 3/14* (2006.01)

(52) U.S. Cl.
CPC .............. *C25C 3/22* (2013.01); *C25C 3/08* (2013.01); *C25C 3/14* (2013.01)

(58) Field of Classification Search
CPC ........................................................ C25C 3/22
See application file for complete search history.

(56) References Cited

U.S. PATENT DOCUMENTS

| | | |
|---|---|---|
| 3,503,184 A | 3/1970 | Knapp et al. |
| 3,664,935 A | 5/1972 | Johnson |

(Continued)

FOREIGN PATENT DOCUMENTS

| | | |
|---|---|---|
| CA | 2951225 C | 12/2015 |
| EP | 2360296 A1 | 8/2011 |

(Continued)

OTHER PUBLICATIONS

International Preliminary Report on Patentability of corresponding PCT application No. PCT/CA2020/050363 dated Sep. 16, 2021.

(Continued)

*Primary Examiner* — Harry D Wilkins, III
(74) *Attorney, Agent, or Firm* — Banner & Witcoff, Ltd.

(57) ABSTRACT

Apparatus and method for collecting and pretreating process gases produced in an electrolytic cell during aluminum production are disclosed. The apparatus comprises a collecting unit configured to draw off primary process gases from the electrolytic cell, for instance by drawing-off primary process gases from orifices purposely made over the electrolytic bath; and a pre-treating unit fluidly connected to the collecting unit and configured to receive a fluid bed of fluorinated alumina for pre-treating the primary process gases. The collecting and pre-treating units are within or immediately aside the electrolytic cell, in the potroom. The apparatus can be combine with a gas treatment center (GTC) located outside the potroom. Among other advantages, the technology allows collecting primary process gases directly at electrolytic bath level, separating primary process gases and hoodspace process gases to pretreat the primary process (Continued)

gases with alumina before the GTC, and using fluid bed reactors without filter bags.

42 Claims, 4 Drawing Sheets

(56) References Cited

U.S. PATENT DOCUMENTS

| | | | | |
|---|---|---|---|---|
| 3,780,497 | A * | 12/1973 | Muhlrad | C25C 3/22 |
| | | | | 95/131 |
| 4,867,851 | A | 9/1989 | Basquin et al. | |
| 2006/0289290 | A1 | 12/2006 | Girault et al. | |
| 2009/0068077 | A1 | 3/2009 | Cloutier et al. | |
| 2013/0048508 | A1 * | 2/2013 | Wedde | C25C 3/22 |
| | | | | 204/246 |
| 2013/0292258 | A1 * | 11/2013 | Wedde | C25C 3/22 |
| | | | | 205/349 |
| 2017/0121833 | A1 * | 5/2017 | Baxter | B01D 53/10 |
| 2017/0283969 | A1 * | 10/2017 | Glisan | B65G 53/22 |

FOREIGN PATENT DOCUMENTS

| | | |
|---|---|---|
| EP | 2660358 A2 | 6/2013 |
| WO | 2008/024931 A2 | 2/2008 |
| WO | 2017173169 A1 | 3/2017 |
| WO | 2015/191022 A1 | 12/2017 |

OTHER PUBLICATIONS

First Examination Report in corresponding GCC application No. 2020-39398 dated Jul. 29, 2021.
Supplementary European Search Report for corresponding EP application No. 20772766.0 dated Jul. 28, 2023.
Office Action dated May 4, 2024 in corresponding application No. PA 2021 70515 in Denmark.

* cited by examiner

SYSTEM AND METHOD FOR COLLECTING AND PRE-TREATING PROCESS GASES GENERATED BY AN ELECTROLYSIS CELL

CROSS-REFERENCE TO RELATED APPLICATIONS

The present non-provisional patent application is a U.S. National Phase of International Patent Application PCT/CA2020/050363, filed Mar. 19, 2020, which is hereby incorporated by reference in its entirety and which claims the benefits of priority of U.S. Provisional Patent Application No. 62/820,917 entitled "SYSTEM AND METHOD FOR COLLECTING AND PRE-TREATING PROCESS GASES GENERATED BY AN ELECTROLYSIS CELL", and filed at the United States Patent and Trademark Office on Mar. 20, 2019, the content of which is also incorporated herein by reference.

TECHNICAL FIELD

The present invention generally relates to systems, apparatus and methods for treating process gases, more particularly, for pretreating primary process gases generated by an electrolytic cell, such as during the production of metals, such as, but not limited to aluminum also called aluminium.

BACKGROUND

Aluminum metal is produced by electrolysis of alumina, also known as aluminium oxide (IUPAC), in a molten electrolyte contained in a number of cells. Evolutions from the electrolytic cells are comprised of a number of gaseous and particulate constituents, referred to as process gases, such as gaseous fluorides (Fg or HF), and particulate fluorides (Fp).

Process gases are treated in a post-processing system at the production plant to recoup valuable constituents therefrom before being released in the atmosphere. The capacity of the post-processing system is set at any given plant by the number of electrolysis cells based on the Hall-Héroult aluminum smelting process.

Because of development of new or improved smelting processes, increased capacity of the post-processing system is required. However, a complete overhaul of the post-processing system at existing plants to accommodate the new or improved process would be costly and might prevent adoption thereof.

The present invention addresses the need for an increased capacity of the post-processing system without complete overhaul.

SUMMARY

This summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

According to a first aspect, the invention is directed to an apparatus for collecting and pre-treating primary process gases produced in an electrolytic cell during the production of aluminum. The apparatus comprises: a collecting unit configured to draw off the primary process gases from an electrolytic bath of the electrolytic cell; and a pre-treating unit fluidly connected to the collecting unit and configured to receive fluorinated alumina for pre-treating the primary process gases, wherein the collecting and pre-treating units are within or immediately aside the electrolytic cell.

According to a preferred embodiment, the collecting unit is configured to draw off the primary process gases from orifices purposely made over the electrolytic bath of the electrolytic cell.

According to a preferred embodiment, the pre-treating unit is configured to receive and contain a fluid bed of fluorinated alumina. Preferably, the pre-treating unit is further configured to drive the primary process gases through the fluid bed of fluorinated alumina. Preferably, the apparatus further comprises an exhausting unit connected to the pre-treating unit and configured to exhaust the pre-treated primary process gases from an upper part of the fluid bed and to drive the pre-treated primary process gases out the pre-treating unit.

According to a preferred embodiment, the apparatus further comprises an alumina flow control system located upstream the pre-treating unit for controlling the alumina flow, preferably by varying the operating time of a discontinuously operating pneumatic conveying system.

According to a preferred embodiment, the apparatus further comprises a buffering unit fluidly connected to the pretreating unit and configured to buffer fluorinated alumina before that the fluorinated alumina be injected into the pre-treating unit.

According to a preferred embodiment, the pre-treating unit is fluidly connected upstream the electrolytic cell, and is further configured to inject at least a portion of the fluorinated alumina contained in the pre-treating unit into the electrolytic cell as feedstock for the production of aluminum.

According to a preferred embodiment, the pre-treating unit is located within the electrolytic cell and fluidly connected to the electrolytic cell, and is further configured to inject at least a portion of the fluorinated alumina contained in the pre-treating unit into the electrolytic cell as feedstock for the production of aluminum.

According to a second aspect, the invention is directed to a method for collecting and pre-treating primary process gases produced in an electrolytic cell during the production of aluminum, the method comprising:
  a) collecting the primary process gases from an electrolytic bath of the electrolytic cell; and
  b) pre-treating the primary process gases obtained in step a) with fluorinated alumina, the pre-treating step being performed within or immediately aside to the electrolytic cell.

According to a preferred embodiment, the collecting step comprises drawing off the primary process gases from orifices purposely made over the electrolytic bath of the electrolytic cell.

According to a preferred embodiment, the pre-treating step b) comprises driving the primary process gases through a fluid bed of fluorinated alumina. Preferably, the method then further comprises the step of exhausting the pre-treated primary process gases from an upper part of the fluid bed. More preferably, the method then further comprises driving the pre-treated primary process gases out the pre-treating unit.

According to a preferred embodiment, the method further comprises controlling the alumina flow, for instance by using an alumina flow control system located upstream the pre-treating unit. Preferably, controlling the alumina flow comprises varying the operating time of a discontinuously operating pneumatic conveying system.

According to a preferred embodiment, the method further comprises buffering the fluorinated alumina before that said fluorinated alumina be used into the pre-treating unit.

According to a preferred embodiment, the method further comprises injecting at least a portion of the fluorinated alumina contained in the pre-treating unit into the electrolytic cell as feedstock for the production of aluminum.

According to a third aspect, the invention is also directed to a method for treating process gases generated by an electrolysis cell, the method comprising the steps of:
 a) collecting primary process gases from an electrolytic bath of the electrolytic cell;
 b) collecting hoodspace process gases from a hoodspace of the electrolytic cell;
 c) pre-treating the primary process gases collected in step a) with partially fluorinated alumina, the pre-treating step being performed within the electrolytic cell or immediately aside to the electrolytic cell;
 d) combining the primary process gases obtained from step c) with the obtained from step b);
 e) contacting the combined process gases obtained from step d) with fresh alumina to form semi-scrubbed process gases and fluorinated alumina;
 f) separating the semi-scrubbed process gases from the fluorinated alumina so as to obtain recirculated fluorinated alumina, and
 g) using, at least in part, the recirculated fluorinated alumina obtained from step f) for pre-treating the primary process gases in step c).

According to a preferred embodiment, steps a) and c) are performed within the electrolytic cell.

According to a preferred embodiment, the step a) of the method comprises the step of drawing off the primary process gases from orifices purposely made over the electrolytic bath of the electrolytic cell.

According to a preferred embodiment, the pre-treating step c) comprises the step of driving the primary process gases through a fluid bed of fluorinated alumina.

According to a preferred embodiment, the method further comprises controlling the alumina flow, for instance by using an alumina flow control system located upstream the pre-treating unit. Preferably, controlling the alumina flow comprises varying the operating time of a discontinuously operating pneumatic conveying system.

According to a preferred embodiment, the method further comprises the step of exhausting pre-treated primary process gases in an upper part of the fluid bed before being combined with the hoodspace process gases.

According to a preferred embodiment, the method further comprises the step of buffering at least a portion of the fluorinated alumina obtained from step f) before being used in step c) for pre-treating the primary process gases.

According to a preferred embodiment, the method further comprises the step of injecting at least a portion of the fluorinated alumina used in step c) into the electrolytic cell as feedstock for the production of aluminum.

According to a preferred embodiment, the method further comprises the step of buffering at least a portion of the fluorinated alumina produced in step f) before being injected into the electrolytic cell as feedstock for the production of aluminum.

According to a preferred embodiment, the method further comprises the step of contacting the process gases in step e) with a portion of the fluorinated alumina obtained from step f). Preferably, the portion of fluorinated alumina is combined with the fresh alumina.

According to a preferred embodiment, the method further comprises the step of venting to the environment scrubbed process gases and residual fluorides obtained from step f).

According to a fourth aspect, the invention is also directed to module assembly for treating gases generated by an electrolysis cell, the module assembly comprising:
 a first collecting module fluidly connected to an electrolytic bath of the electrolytic cell and configured to collect primary process gases produced in the electrolytic cell;
 a second collecting module fluidly connected to a hoodspace of the electrolytic cell and configured to collect hoodspace process gases produced in the electrolytic cell;
 a pre-treating module fluidly connected to the first collecting module and configured to pre-treat the primary process gases with partially fluorinated alumina, the pre-treating module being located within the electrolytic cell or immediately aside to the electrolytic cell;
 a combining module fluidly connected to the pre-treating module and the second collecting module and configured to combine the hoodspace process gases with the primary process gases pre-treated in the pre-treating module;
 a scrubber module fluidly connected to the combining module and configured to contact the combined process gases with fresh alumina to form semi-scrubbed process gases and fluorinated alumina; and
 a filtering module fluidly connected to the scrubber module and configured to separate the semi-scrubbed process gases from the fluorinated alumina so as to obtain fluorinated alumina, the filtering module being further fluidly connected to the pre-treating module and configured to reinject, at least in part, the fluorinated alumina into the pre-treating module.

According to a preferred embodiment, the first collecting module and the pre-treating module are located within the electrolytic cell. the pre-treating module being also fluidly connected to the electrolytic cell and is further configured to inject at least a portion of the fluorinated alumina contained in the pre-treating unit into the electrolytic cell as feedstock for the production of aluminum.

According to a preferred embodiment, the first collecting module is configured to draw off the primary process gases from orifices purposely made over the electrolytic bath of the electrolytic cell.

According to a preferred embodiment, the pre-treating module is configured to contain a fluid bed of fluorinated alumina and to drive the primary process gases through the fluid bed of fluorinated alumina.

According to a preferred embodiment, the module assembly further comprises an exhausting module located downstream the pre-treating module and upstream the combining module, and configured to exhaust the pre-treated primary process gases from an upper part of the fluid bed and to drive the pre-treated primary process gases toward the combining module.

According to a preferred embodiment, the module assembly further comprises a first buffering module located downstream the filtering module and upstream the pre-treating module, and configured to buffer at least a portion the fluorinated alumina before being injected into the pre-treating module.

According to a preferred embodiment, the module assembly further comprises a second buffering module located downstream the filtering module and upstream the electrolytic cell, and configured to buffer at least a portion the fluorinated alumina before being injected into the electrolytic cell as feedstock for the production of aluminum. Preferably, the first and second buffering modules may form a unique buffering module fluidly connected to the pre-treating module and the electrolytic cell.

According to a preferred embodiment, the pre-treating module is also fluidly connected to the electrolytic cell and configured to inject at least a portion of the fluorinated alumina contained in the pre-treating module into the electrolytic cell as feedstock for the production of aluminum.

According to a preferred embodiment, the scrubber module is also fluidly connected upstream to the filtering module, and configured to receive from the filtering module a portion of the fluorinated alumina.

According to a preferred embodiment, the scrubber module is further configured to combine the portion of fluorinated alumina with the fresh alumina.

According to a preferred embodiment, the module assembly further comprises a venting module fluidly connected to the filtering module and configured to vent to the environment scrubbed process gases and residual fluorides separated in the filtering module from the fluorinated alumina.

According to a preferred embodiment, the module assembly further comprises an alumina flow control module located upstream the pre-treating module for controlling a flow of fluorinated alumina. Preferably, the alumina flow control module comprises a discontinuously operating pneumatic conveying system, the fluorinated alumina flow being controlled by varying an operating time of the discontinuously operating pneumatic conveying system.

According to yet another aspect, the invention is directed to an electrolytic cell assembly for the production of aluminum comprising: at least one electrolytic cell configured for producing aluminum; and for each of said at least one electrolytic cell, an apparatus for collecting and pre-treating primary process gases produced in the electrolytic cell during the production of aluminum, the apparatus being as defined herein.

According to yet another aspect, the invention is directed to an electrolytic cell assembly for the production of aluminum comprising: at least one electrolytic cell configured for producing aluminum; and at least one module assembly for treating gases generated by an electrolysis cell as defined herein.

According to yet another aspect, the invention is directed to the use of an electrolytic cell assembly as defined herein for the production of aluminum.

BRIEF DESCRIPTION OF THE DRAWINGS

Further features and exemplary advantages of the present invention will become apparent from the following detailed description, taken in conjunction with the appended drawings, in which.

DETAILED DESCRIPTION

A novel process will be described hereinafter. Although the invention is described in terms of specific illustrative embodiments, it is to be understood that the embodiments described herein are by way of example only and that the scope of the invention is not intended to be limited thereby.

The terminology used herein is in accordance with definitions set out below.

As used herein % or wt. % means weight % unless otherwise indicated. When used herein % refers to weight % as compared to the total weight percent of the phase or composition that is being discussed.

By "about", it is meant that the value of weight % (wt. %), time, pH, volume or temperature can vary within a certain range depending on the margin of error of the method or device used to evaluate such weight %, time, pH, volume or temperature. A margin of error of 10% is generally accepted.

The description which follows, and the embodiments described therein are provided by way of illustration of an example of particular embodiments of principles and aspects of the present invention. These examples are provided for the purposes of explanation and not of limitation, of those principles of the invention. In the description that follows, like parts and/or steps are marked throughout the specification and the drawing with the same respective reference numerals.

The embodiments of the present invention shall be more clearly understood with reference to the following detailed description taken in conjunction with the accompanying drawings, FIGS. 1, 2, 3 and 4.

At the production plant electrolysis cells are hooded by removable covers and most of the process gases are drawn-off from the cells by a number of exhaust fans through a number of gas-solid reactors and filters, referred to as the scrubbers. Most gaseous fluorides and particulates (including particulate fluorides) are trapped onto alumina and ultimately return to the cells as feeding material, called reacted alumina or fluorinated alumina.

There are two main types of dry scrubbers: injection-type scrubbers, where the alumina is injected through a high velocity stream of process gases; and fluid bed scrubbers, where process gases and alumina form a high residence time fluid bed enhancing the adsorption kinetics of gaseous fluorides onto the surface of alumina. Fluid beds are described for instance in U.S. Pat. No. 3,503,184 (Knapp et al.).

Centralized Gas Treatment Center (GTC) typically allows the scrubbing of hydrogen fluoride with fresh alumina and fluorinated alumina (for injection-type GTCs) injected into the process gases to form semi-scrubbed process gases and fluorinated alumina, which are subsequently separated by filtration. The fluorinated alumina is known to improve the contact quality between the process gases and alumina. The scrubbed process gases and residual fluorides are vented or exhausted to the environment whereas the fluorinated alumina is typically stored before being conveyed back to the electrolytic cell(s) as feedstock for the production of aluminum.

Aluminum producers aim at constantly increasing potline amperage in order to increase cell productivity. This is referred to as potline retrofit. In a number of plant retrofits, the concentration of process gases increases and may exceed the treatment capacity, particularly when the scrubber is an injection-type scrubber.

Figure 1:
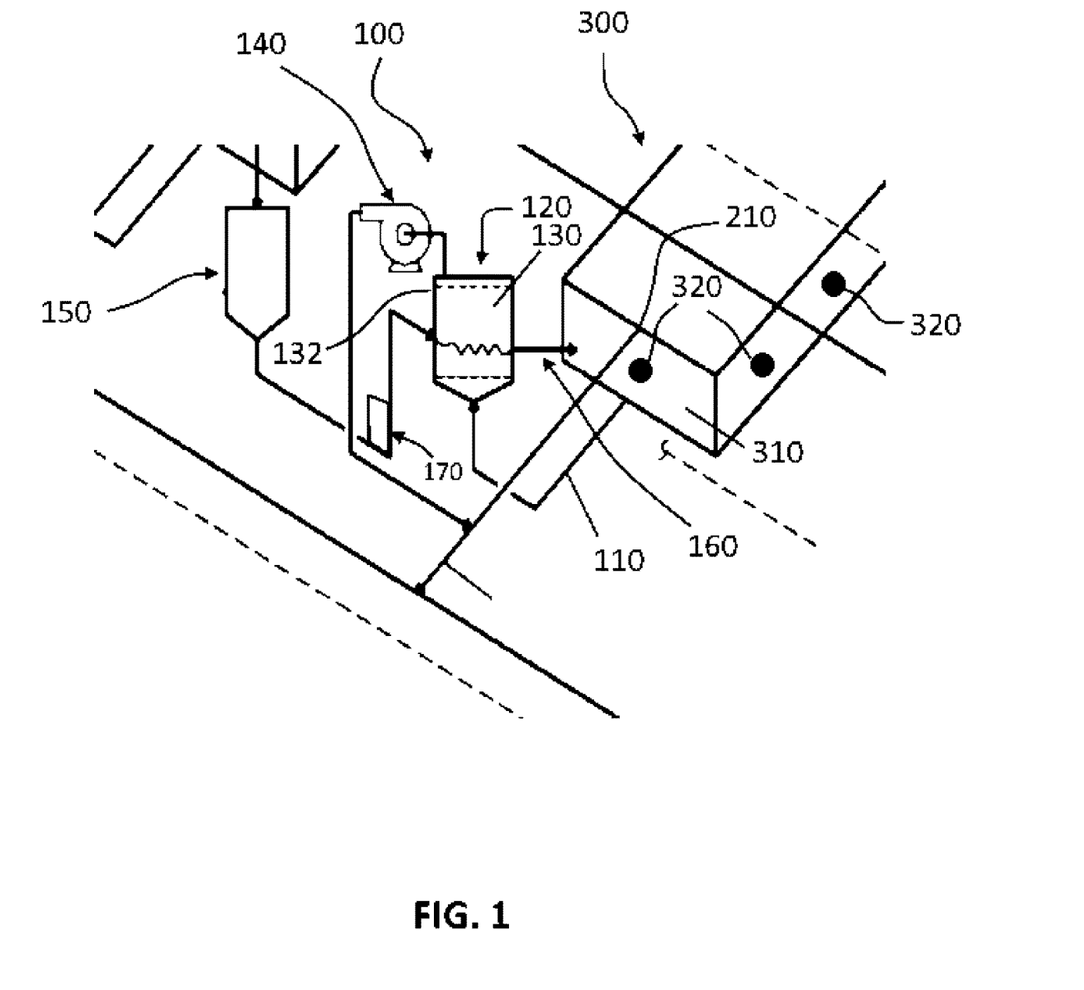
FIG. 1 is a schematic view of the apparatus or collecting and pre-treating primary process gases produced in an electrolytic cell during the production of aluminum in accordance with a preferred embodiment of the present invention.

As aforesaid, according to a first aspect, the invention is directed to an apparatus 100, as the one illustrated on FIG. 1, for collecting and pre-treating primary process gases produced in an electrolytic cell 300 during the production of a metal, such as but not limited to aluminum. The apparatus 100 comprises a collecting unit 110 configured to draw off the primary process gases from an electrolytic bath 310 of the electrolytic cell 300. The collecting unit 110 is typically configured to draw off the primary process gases from orifices 320 purposely made over the electrolytic bath 310 of the electrolytic cell 300. By "primary process gases", it is meant hot and concentrated gases which are collected above the electrolytic bath, before any dilution with outside air.

The apparatus 100 further comprises a pre-treating unit 120 fluidly connected to the collecting unit 110 and configured to receive fluorinated alumina for pre-treating the primary process gases. Typically, the pre-treating unit 120 may consist in a fluid bed reactor, without filter bags, and installed in the vicinity of the electrolytic cells, typically one per cell as illustrated on FIG. 3, or one for several cells. The reactor 120 is configured to receive and contain the fluid bed 130 of fluorinated alumina, and to drive the primary process gases through the fluid bed 130. The collecting and pre-treating units 110,120 are located immediately within, aside, near or adjacent the electrolytic cell(s) 300. The fluid bed reactor is preferably equipped with an exhausting unit 140, consisting for instance in one or several exhaust fans, preferably connected to the upper part 132 of the reactor for driving the pre-treated primary process gases out of the fluid bed reactor 120. Alternately there may be one or several exhaust fan(s) 140 servicing several fluid bed reactors 120. The exhausting unit 140 may be located inside or outside the pot-room building 400. For each cell, a fraction of process gases considered as primary process gases is collected at the purposely-made orifices 320 in the cover separating the electrolytic bath 310 from the outside, driven through the relevant fluid-bed and exhausted in the upper part of the fluid bed.

As also illustrated on FIG. 1, the apparatus 100 may further comprise a buffering unit 150, such as a buffer hopper, fluidly connected to the pretreating unit 120 and configured to buffer fluorinated alumina before injecting it into the pre-treating unit 120. For instance, as illustrated on FIG. 3, the buffer hopper 150 can be located underneath an alumina distribution system 510 coming from a centralized gas treatment center or GTC 500. The alumina reclaimed from the hopper 150 can then be raised at an appropriate level at the required quantity to feed the fluid bed 130 of the pre-treating unit 120 and ultimately the cell 300 or group of cells. Indeed, the pre-treating unit or fluid bed reactor 120 may be fluidly connected upstream 160 the electrolytic cell 300, such as with an air-slide or air-conveyor, to inject at least a portion of the fluorinated alumina contained in the pre-treating unit 120 into the electrolytic cell 300 as feedstock for the production of aluminum. Known feeding systems of electrolytic cells are used, such as the ones disclosed in WO 2017/173169 A1 (Lucey et al.), the content of which is incorporated herein by reference.

As illustrated in FIG. 1, the apparatus 100 may further comprises an alumina flow control system 170 located upstream the pre-treating unit 120 for controlling the alumina flow, preferably by varying the operating time of a discontinuously operating pneumatic conveying system. Since the electrolytic cell is supplied in alumina from the fluid bed reactor 120, the rate of alumina demand by the electrolytic cell actually determines the rate of alumina supply to the fluid bed reactor 120.

Figure 2:
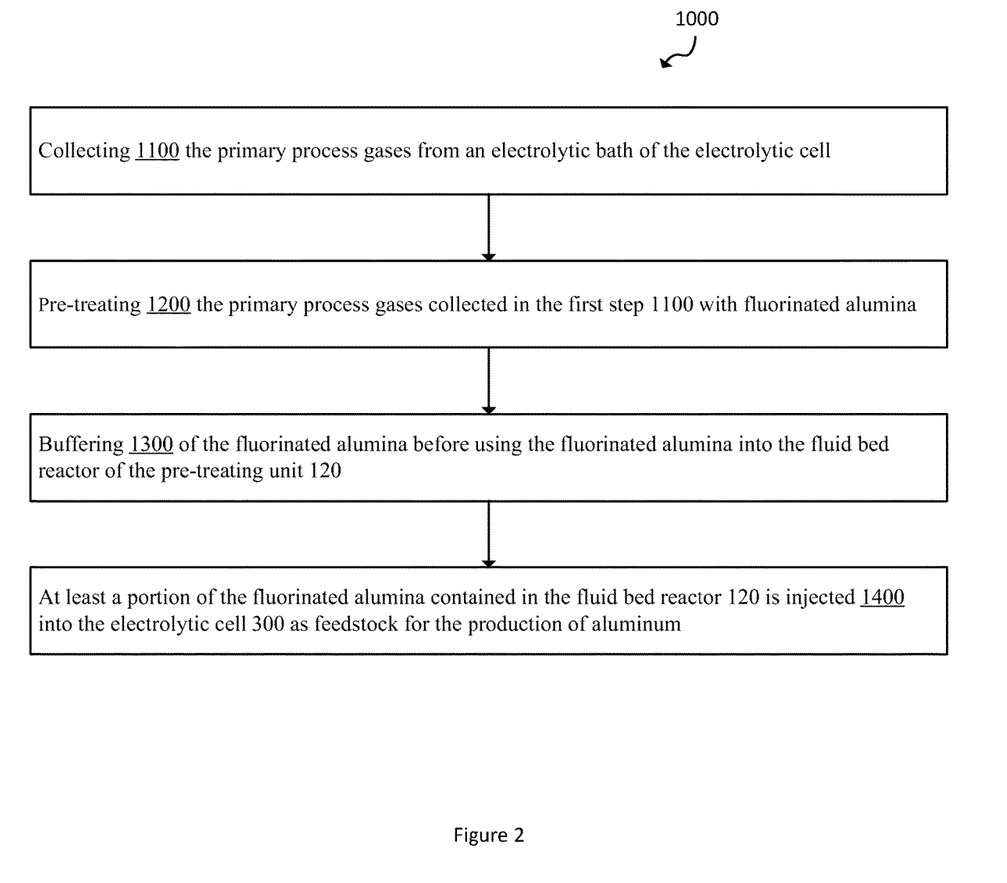
FIG. 2 is flowchart illustrating a method for collecting and pre-treating primary process gases produced in an electrolytic cell during the production of aluminum in accordance with a preferred embodiment of the present invention.

A preferred method for collecting and pre-treating primary process gases produced in an electrolytic cell during the production of aluminum is illustrated on FIG. 2.

The method 1000 comprises a first step 1100 of collecting the primary process gases from an electrolytic bath of the electrolytic cell. Preferably, the first step may consist in drawing off the primary process gases from the orifices, such as those 320 illustrated on FIG. 1, purposely made over the electrolytic bath 310 of the electrolytic cell 300. As aforesaid, the orifices or holes can be made in the cover separating the electrolytic bath 310 from the outside of the electrolytic cell, before being driven through the fluid-bed reactor and exhausted out of the reactor from the upper part of the fluid bed. Other possible ways to collect primary gas from the electrolytic bath of an electrolytic cell may considered within the scope of the present invention.

The method 1000 comprises a second step 1200 of pre-treating the primary process gases collected in the first step 1100 with fluorinated alumina. Advantageously, the pre-treating step 1200 is performed immediately aside or adjacently the electrolytic cell, inside the pot-room building 400. Preferably, the pre-treating step 1200 may comprise driving the primary process gases through a fluid bed of fluorinated alumina. Preferably, the method 1000 then further comprises the step of exhausting the pre-treated primary process gases from an upper part of the fluid bed 1300, driving as such the pre-treated primary process gases out the pre-treating unit.

The method 1000 may further comprise a buffering step 1300 of the fluorinated alumina before using the fluorinated alumina into the fluid bed reactor of the pre-treating unit 120. A buffering hopper such as the one disclosed above, can be used.

Then in a fourth step of the method 1000, at least a portion of the fluorinated alumina contained in the fluid bed reactor 120 is injected into the electrolytic cell 300 as feedstock for the production of aluminum. As mentioned above, reclaimed alumina from the hopper 150 can then be raised at an appropriate level at the required quantity to feed the fluid bed 130 of the pre-treating unit 120 and ultimately the cell 300 or group of cells.

Figure 3:
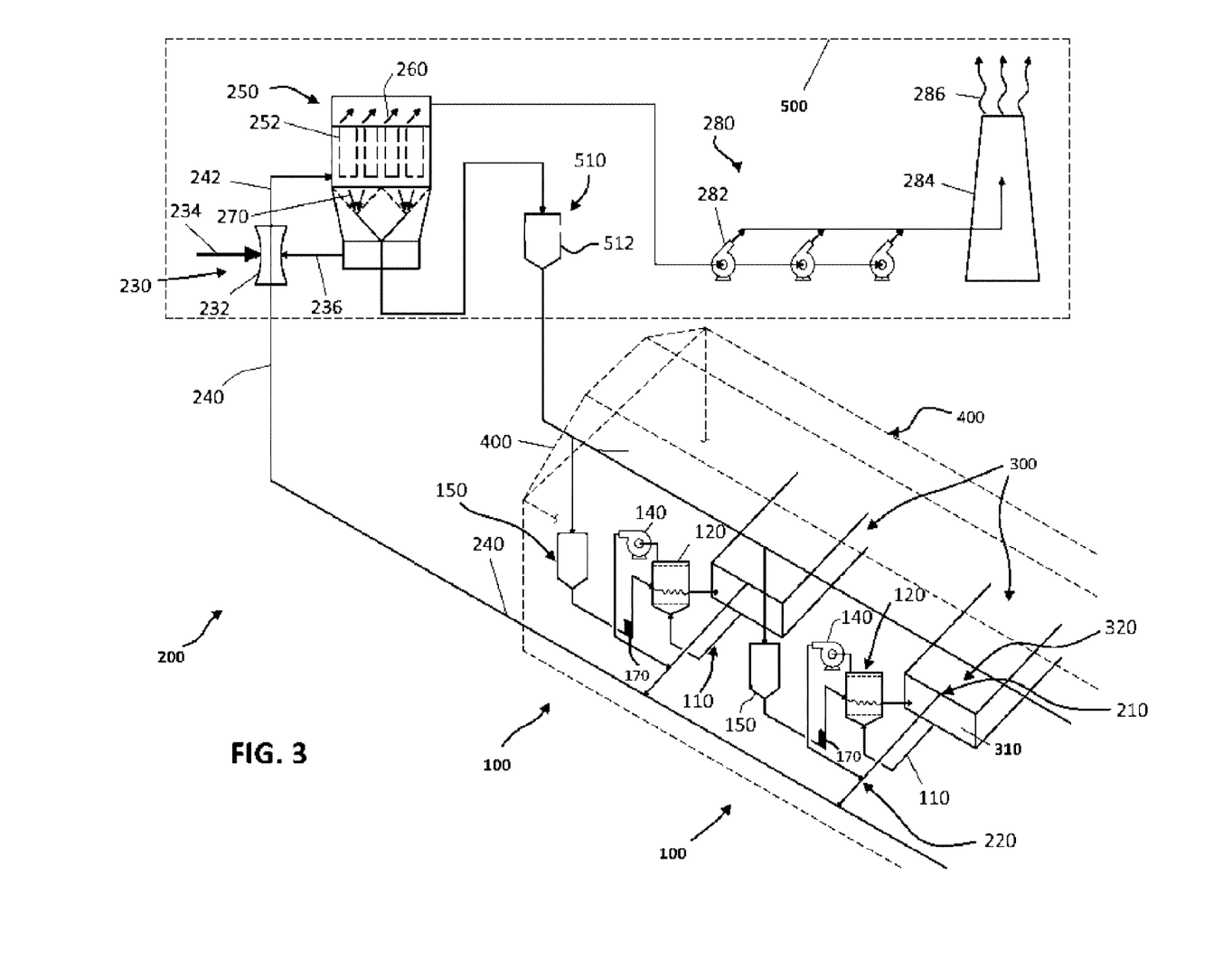
FIG. 3 is a schematic view of the module assembly for treating process gases generated by an electrolysis cell in accordance with a preferred embodiment of the present invention.

A preferred embodiment of the module assembly in accordance with the present invention is illustrated on FIG. 3, and typically consists in one or more pre-treating apparatus 100 as disclosed above located in the pot-room building 400 by each electrolytic cell 300, and operatively fluidly connected to a centralized gas treatment center or GTC 500.

The module assembly 200 comprises at least one first collecting module 110, each fluidly connected to an electrolytic bath 310 of the electrolytic cell 300 and configured to collect primary process gases produced in the electrolytic cell. As for the collecting unit of the apparatus 100 disclosed above, the first collecting module 120 is configured to draw off primary process gases from orifices 320 purposely made over the electrolytic bath 310 of the electrolytic cell 300.

For each cell 300, the module assembly 200 also comprises a second collecting module 210 fluidly connected to the hoodspace 320 of each electrolytic cell 300 and configured to collect hoodspace process gases produced in the cell. By "hoodspace process gases", it is meant gases, which are collected below the electrolytic cell hooding, and include dilution with outside air. Their concentrations and temperatures are lower than those of primary process gases.

The module assembly 200 comprises for each cell 300 at least one pre-treating module 120, also preferably named herein fluid bed reactor 120, fluidly connected to the first collecting module 110 and configured to pre-treat the primary process gases with partially fluorinated alumina.

For each electrolytic cell 300, the module assembly 200 may further comprise a combining module 220 fluidly connected to the pre-treating module 120 and the second collecting module 210, for combining the hoodspace process gases conveyed from the hoodspace 320 of the cell 300 with the primary process gases conveyed from the pre-treating module 120.

As illustrated in FIG. 3, the module assembly 200 may further comprises an alumina flow control system 170 located upstream the pre-treating unit 120 for controlling the alumina flow, preferably by varying the operating time of a discontinuously operating pneumatic conveying system. Since the electrolytic cell is supplied in alumina from the fluid bed reactor 120, the rate of alumina demand by the electrolytic cell actually determines the rate of alumina supply to the fluid bed reactor 120.

The module assembly 200 as illustrated on FIG. 3, further comprises a scrubber module 230 fluidly connected to the combining module, such as for instance using a centralized gas duct 240. The scrubbing of the gas mixture containing hydrogen fluoride from the hoodspace process gases occurs in the reactor 232 of the scrubber module 230, where fresh alumina 234 and fluorinated alumina 236 are contacted with the hoodspace process gases conveyed by the centralized gas duct 240. Then, the treated mixture exits the reactor 232 as semi-scrubbed process gases through a semi-scrubbed process gas duct 242.

The module assembly 200 as illustrated on FIG. 3, further comprises a filtering module 250, having one or more filters 252 fluidly connected to one or more reactor 232 via the semi-scrubbed process gas duct 242. The scrubbed process gases 260, once separated from the fluorinated alumina by the filters, are conveyed toward a venting module 280 fluidly connected to the filtering module 250 and comprising exhaust fans 282 and a stack 284 to vent scrubbed process gases 260 and residual fluorides 286 to the environment.

In the filtering module 250, a portion 236 of fluorinated alumina 270, called recirculated alumina, can be reinjected back into the scrubber reactor 232 for contacting the gas, whereas another portion of fluorinated alumina 270 is conveyed toward an alumina distribution system 510 comprising a bin 512. Then, the fluorinated alumina, also called semi-fluorinated alumina, can be injected into each of the pre-treating modules 120 of the module assembly 200, and/or into each electrolytic cell as alumina feedstock.

As for the pre-treating unit disclosed here above, the pre-treating module 120 contains a fluid bed 130 of partially fluorinated alumina through which the primary process gases collected from the electrolytic bath are driven, before exiting the upper part 132 of the fluid bed thanks to an exhausting module 140 located downstream the pre-treating module 120. The exhausting module 140 is also located upstream the combining module 220 where the pre-treated primary process gases are conveyed before being combined with the hoodspace process gases in the combining module 120.

The module assembly 200 illustrated on FIG. 3 further comprises at least one first buffering module 150 located downstream the alumina distribution system 510 of the GTC 500 and, and upstream the pre-treating module 120. Each buffering module 150 buffers at least a portion of the semi-fluorinated alumina before being injected into the pre-treating module 120.

According to a preferred embodiment, non-illustrated on the drawings, the module assembly may further comprise a second buffering module located downstream the GTC 500 to buffer at least a portion the semi-fluorinated alumina before being injected directly into the electrolytic cell as feedstock for the production of aluminum. Preferably, the first and second buffering modules may form a unique buffering module fluidly connected to both the pre-treating module and the electrolytic cell. A portion of the partially-fluorinated or semi-fluorinated alumina 160 contained in the pre-treating module 120 can be injected into the electrolytic cell 300 as feedstock for the production of aluminum.

Figure 4:
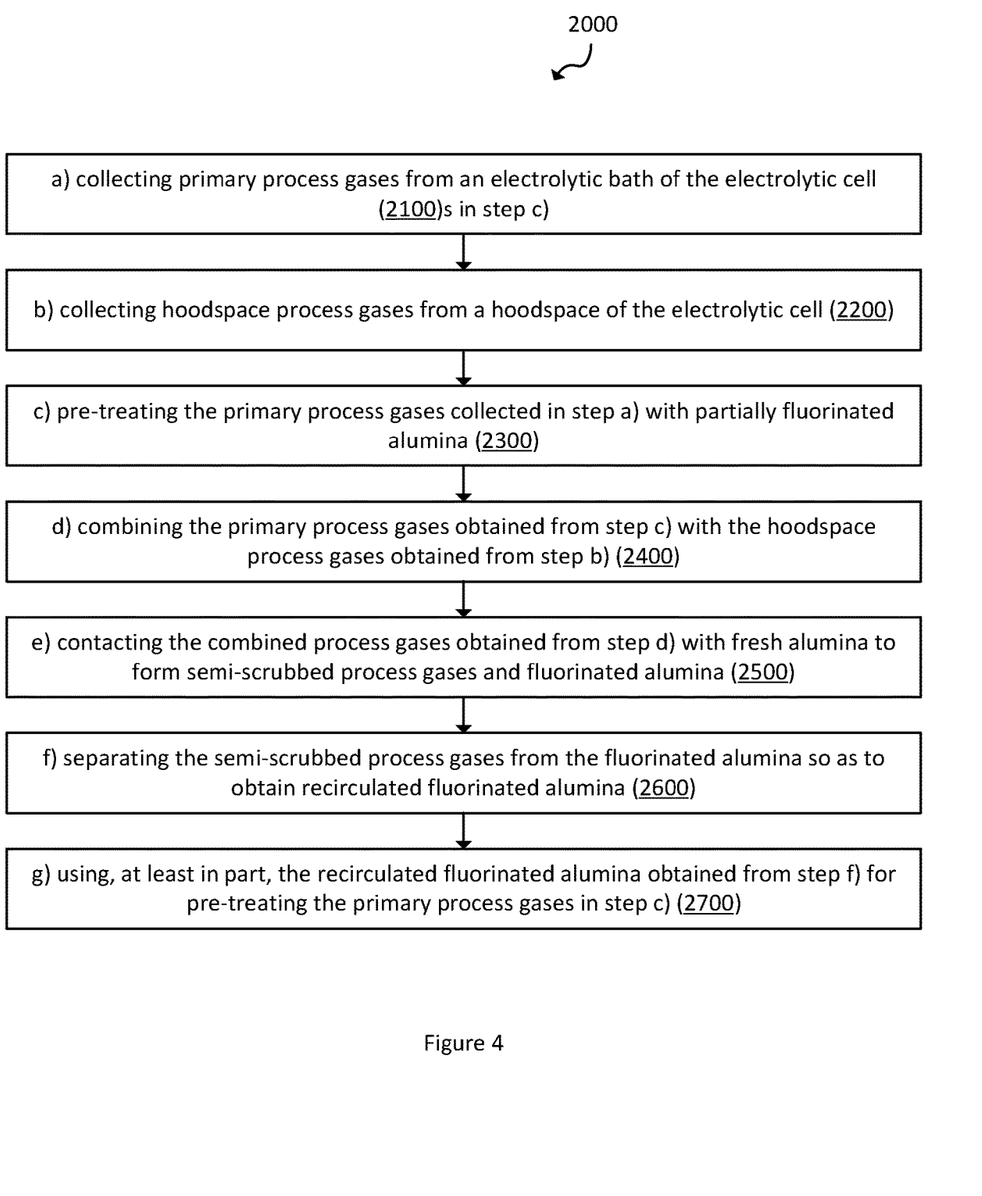
FIG. 4 is flowchart illustrating a method for treating process gases generated by an electrolysis cell in accordance with a preferred embodiment of the present invention.

A method for treating process gases generated by an electrolysis cell is illustrated on FIG. 4. The method 2000 comprises the steps of:
a) collecting primary process gases from an electrolytic bath of the electrolytic cell (2100);
b) collecting hoodspace process gases from the hoodspace of the electrolytic cell (2200);
c) pre-treating the primary process gases collected in step a) with partially fluorinated alumina (2300);
d) combining the primary process gases obtained from step c) with the hoodspace process gases obtained from step b) (2400);
e) contacting the combined process gases obtained from step d) with fresh alumina to form semi-scrubbed process gases and fluorinated alumina (2500);
f) separating the semi-scrubbed process gases from the fluorinated alumina so as to obtain scrubbed gases and fluorinated alumina (2600), and
g) using, at least in part, the recirculated fluorinated alumina obtained from step f) for pre-treating the primary process gases in step c) (2700).

The step a) 2100 of the method 2000 may comprise the step of drawing off 2110 the primary process gases from orifices purposely made over the electrolytic bath of the electrolytic cell. The pre-treating step c) 2300 may comprise the step of driving 2310 the primary process gases through a fluid bed of fluorinated alumina.

The method 2000 may further comprise the step of exhausting 2320 pre-treated primary process gases in an upper part of the fluid bed before combining 2400 pre-treated gases with hoodspace process gases.

The method 2000 may further comprise the step of buffering 2800 at least a portion of the fluorinated alumina obtained from step f) 2600 before being used in step c) 2300 for pre-treating the primary process gases, and/or before being injected into the electrolytic cell as feedstock for the production of aluminum.

The method 2000 may further comprise the step of contacting 2520 the process gases in step e) 2500 with a portion of the fluorinated alumina obtained from step f) 2600. Preferably, the portion of fluorinated alumina is combined with the fresh alumina.

The method 2000 may further comprise the step of venting to the environment 2900 semi-scrubbed process gases and residual fluorides obtained from step f) 2600.

In other words, the new methods disclosed herein consists in collecting a significant fraction of process gases drawn-off from the electrolytic bath, such as using for instance purposely-made orifices over the electrolytic bath, then pre-treat this fraction in a pre-treating unit or module, such as a fluid-bed reactor (one per cell or one for several cells) using alumina, such as, for instance, partially fluorinated alumina from a GTC. This gas fraction, one pre-treated, is returned to the centralized process cell duct for further treatment and gas-solid separation with the rest of the process gases in the centralized GTC. The fluorinated alumina leaving the fluid bed is used as feedstock for the corresponding cell(s). A new safety alumina stock is located immediately downstream the feeding point from the common alumina distribution system to the cell. Alumina is then reclaimed from this safety stock and raised to the appropriate level for feeding the fluid-bed reactor.

GTCs known in the art have provided efficient gas treatment but at the cost of a much larger footprint, due to the fact that the totality of process gases are treated. Also, in some retrofit plants, GTCs only are not sufficient to overcome the increase in process gas concentrations.

Integrated Gas Treatment (IGT) known in the art have several drawbacks. For instance, the collection point of process gases is not modified; the fluidized bed is housed in a superstructure; the totality of process gases is treated in the fluid bed (i.e. the GTCs are not in use any more); the fluid bed is fed with fresh alumina; the scrubbed process gases are separated from the alumina using a filter; and the scrubber process gases are vented to the open environment.

Existing solutions allow for the retrofit of existing injection-type GTC, but can only cope with marginal over-concentrations of process gases. The centralized fluid bed scrubber, as a substitute to injection-type GTCs in the context of a plant retrofit, is a very costly solution, difficult to tie-in to the existing gas ducts and alumina silos and difficult to locate in already congested existing GTC courtyards. The IGT solution, as a substitute for injection-type GTCs, allows for the treatment of concentrated process gases but necessitates a filter within the cell superstructure. Furthermore the safety stock conventionally provided by the superstructure alumina bins, in case of upstream alumina circuit failure, disappears.

The systems, apparatus and methods disclosed herein does not necessitate complicated tie-in to existing potline ducting and alumina silos: the only tie-ins are located at each cell, upstream to the existing fluorinated alumina conveying system and downstream to the existing cell gas duct and cell fluorinated alumina delivering system.

In addition, the systems and apparatus disclosed herein may be located immediately aside or adjacent to each electrolytic cell, or outside the pot-room building and therefore do not necessitate any area above the electrolytic cell(s).

Furthermore, the pre-treating apparatus disclosed herein do not require an embedded filter, which filter bag change is a difficult and tending machine time-consuming exercise.

The technology disclosed herein does not affect the safety alumina stock required at each cell.

The technology disclosed herein provides the following solutions:
The collection of primary process gases directly at electrolytic bath level;
The separation of primary process gases and hoodspace process gases;
The use of fluid bed reactors without filter bags;
The integration of an existing GTC with fluid bed reactors in a counter-current scrubbing process; and
The high contact-time between primary process gases and fluorinated alumina, which preheats feedstock alumina at a temperature close to the primary process gases.

Advantageously, the technology disclosed herein allows:
recovering some constituents of primary process gases, due to their high concentration;
recovering waste heat from primary process gases;
reducing the evolution of HF due to less contact with the water content of the outside air entering between hoods;
reducing the evolution of particulate fluorides in the hoodspace;
reducing the total surface of fluid bed;
eliminating the necessity to change bags within the cell superstructure;
eliminating tie-ins to existing facilities such as the silos;
reducing the velocity and concentration of gases in the GTC, offering spare capacity for boosted suction of hoodspace process gases;
eliminating the requirement to remove completely gaseous and particulate fluorides in the fluid bed;
reducing the evolution of HF due to a lesser extent of residual hydroxyls (—OH) at the surface of fluorinated alumina; and
increasing the energy efficiency of the electrolytic cell.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

What is claimed is:

1. An apparatus for collecting and pre-treating primary process gases produced in an electrolytic bath of an electrolytic cell during production of aluminum, the apparatus comprising:
a cover separating the electrolytic bath from a cell hoodspace;
a collecting unit located immediately aside the electrolytic cell and fluidly connected to orifices purposely made in the cover of the electrolytic cell to draw off the primary process gases from the electrolytic bath of the electrolytic cell, wherein the primary process gases consist essentially of hot and concentrated gases which are collected above the electrolytic bath before any dilution of the primary process gases with contained hoodspace air; and
a pre-treating unit located immediately aside or adjacently to the electrolytic cell,
wherein the pre-treating unit is fluidly connected to the collecting unit, and the pre-treating unit comprises a fluid bed reactor configured to receive and contain a fluid bed of fluorinated alumina, the fluid bed reactor being configured to drive the primary process gases through the fluid bed of fluorinated alumina for pre-treating the primary process gases.

2. The apparatus according to claim 1, further comprising an exhausting unit comprising one or several exhaust fans connected to an upper part of the fluid bed reactor of the pre-treating unit to exhaust the pre-treated primary process gases from the upper part of the fluid bed reactor and to drive the pre-treated primary process gases out the pre-treating unit.

3. The apparatus according to claim 1, further comprising an alumina flow control system located upstream the pre-treating unit for controlling a flow of the fluorinated alumina.

4. The apparatus according to claim 3, wherein the alumina flow control system comprises a discontinuously operating pneumatic conveying system, the flow of the fluorinated alumina being controlled by varying an operating time of the discontinuously operating pneumatic conveying system.

5. The apparatus according to claim 1, further comprising a buffering unit fluidly connected to the pre-treating unit and configured to buffer fluorinated alumina before that said fluorinated alumina be injected into the pre-treating unit.

6. The apparatus according to claim 1, wherein the pre-treating unit is further fluidly connected upstream the electrolytic cell to inject at least a portion of the fluorinated alumina contained in the pre-treating unit into the electrolytic cell as feedstock for the production of aluminum.

7. The apparatus according to claim 1, further comprising a second collecting module fluidly connected to the cell hoodspace of the electrolytic cell and configured to collect hoodspace process gases produced in the electrolytic cell.

8. The apparatus according to claim 7, further comprising a combining module fluidly connected to the pre-treating unit and the second collecting module and configured to combine the hoodspace process gases with the primary process gases pre-treated in the pre-treating unit.

9. An electrolytic cell assembly for production of aluminum comprising:
at least one electrolytic cell configured for producing aluminum; and
for each of said at least one electrolytic cell, an apparatus for collecting and pre-treating primary process gases produced in the electrolytic cell during the production of aluminum, the apparatus being as defined in claim 1.

10. A method for collecting and pre-treating primary process gases produced in an electrolytic bath of an electrolytic cell during production of aluminum, the method comprising:
a. collecting the primary process gases from the electrolytic bath of the electrolytic cell by drawing off the primary process gases from the electrolytic bath using orifices purposely made in a cover separating the electrolytic bath of the electrolytic cell from a cell hoodspace of the electrolytic cell, wherein the primary process gases consist essentially of hot and concentrated gases which are collected above the electrolytic bath before any dilution of the primary process gases with outside contained hoodspace air; and
b. pre-treating the primary process gases obtained in step a) by driving the primary process gases through a fluid bed of fluorinated alumina, wherein the pre-treating is performed immediately aside or adjacently to the electrolytic cell.

11. The method according to claim 10, further comprising the step of exhausting the pre-treated primary process gases from an upper part of the fluid bed.

12. The method according to claim 10, further comprising controlling a flow of the fluorinated alumina during the pre-treating.

13. The method according to claim 12, wherein controlling the flow comprises varying an operating time of a discontinuously operating pneumatic conveying system.

14. The method according to claim 10, further comprising buffering the fluorinated alumina before that said fluorinated alumina be used in the fluid bed.

15. The method according to claim 10, further comprising injecting at least a portion of the fluorinated alumina contained in the fluid bed into the electrolytic cell as feedstock for the production of aluminum.

16. The method according to claim 10, further comprising collecting hoodspace process gases from the cell hoodspace of the electrolytic cell.

17. The method according to claim 16, further comprising combining the primary process gases after the pre-treating with the hoodspace process gases.

18. A method for treating primary process gases generated in an electrolytic bath of an electrolytic cell, the method comprising:
a. collecting primary process gases from the electrolytic bath of the electrolytic cell by drawing off the primary process gases from the electrolytic bath, wherein the primary process gases consist essentially of hot and concentrated gases which are collected above the electrolytic bath before any dilution of the primary process gases with contained hoodspace air using orifices purposely made over the electrolytic bath of the electrolytic cell;
b. collecting hoodspace process gases from a hoodspace of the electrolytic cell;
c. pre-treating the primary process gases collected in step a) with fluorinated alumina by driving the primary process gases through a fluid bed of the fluorinated alumina, the pre-treating being performed immediately aside or adjacently to the electrolytic cell;
d. combining the primary process gases obtained from step c) with the hoodspace process gases obtained from step b) to form combined process gases;
e. contacting the combined process gases obtained from step d) with fresh alumina to form semi-scrubbed process gases and fluorinated alumina;
f. separating the semi-scrubbed process gases from the fluorinated alumina so as to obtain recirculated fluorinated alumina, and
g. using, at least in part, the recirculated fluorinated alumina obtained from step f) for pre-treating the primary process gases in step c).

19. The method of claim 18, further comprising the step of exhausting pre-treated primary process gases in an upper part of the fluid bed before being combined with the hoodspace process gases.

20. The method according to claim 18, further comprising controlling at least a portion of a flow of the recirculated fluorinated alumina obtained from step f) before being used in step c) for pretreating the primary process gases.

21. The method of claim 20, wherein controlling comprises varying an operating time of a discontinuously operating pneumatic conveying system.

22. The method according to claim 18, further comprising the step of buffering at least a portion of the recirculated fluorinated alumina obtained from step f) before being used in step c) for pre-treating the primary process gases.

23. The method according to claim 22, further comprising the step of injecting at least a portion of the recirculated fluorinated alumina used in step c) into the electrolytic cell as feedstock for production of aluminum.

24. The method according to claim 18, further comprising the step of buffering at least a portion of the recirculated fluorinated alumina produced in step f) before being injected into the electrolytic cell as feedstock for production of aluminum.

25. The method according to claim 18, further comprising the step of contacting the combined process gases in step e) with a portion of the fluorinated alumina obtained from step f).

26. The method according to claim 25, wherein the portion of the fluorinated alumina is combined with the fresh alumina.

27. The method according to claim 18, further comprising the step of venting to an environment scrubbed process gases and residual fluorides obtained from step f).

28. The method according to claim 18, wherein the orifices are purposely made in a cover separating the electrolytic bath of the electrolytic cell from the hoodspace of the electrolytic cell.

29. A module assembly for treating gases generated by an electrolytic bath of an electrolytic cell, the module comprising:
- a first collecting module fluidly connected to the electrolytic bath of the electrolytic cell and configured to collect primary process gases produced in the electrolytic cell, wherein the primary process gases consist essentially of hot and concentrated gases which are collected above the electrolytic bath before any dilution of the primary process gases with contained hoodspace air using orifices purposely made over the electrolytic bath of the electrolytic cell;
- a second collecting module fluidly connected to a hoodspace of the electrolytic cell and configured to collect hoodspace process gases produced in the electrolytic cell;
- a pre-treating module fluidly connected to the first collecting module and comprising a fluid bed reactor of fluorinated alumina, the pre-treating module being configured to drive the primary process gases through the fluid bed reactor of fluorinated alumina to pre-treat the primary process gases with partially fluorinated alumina, the pre-treating module being located immediately aside to the electrolytic cell;
- a combining module fluidly connected to the pre-treating module and the second collecting module and configured to combine the hoodspace process gases with the primary process gases pre-treated in the pre-treating module to form combined process gases;
- a scrubber module fluidly connected to the combining module and configured to contact the combined process gases with fresh alumina to form semi-scrubbed process gases and fluorinated alumina; and
- a filtering module fluidly connected to the scrubber module and configured to separate the semi-scrubbed process gases from the fluorinated alumina so as to obtain fluorinated alumina, the filtering module being further fluidly connected to the pre-treating module and configured to reinject, at least in part, the fluorinated alumina into the pre-treating module.

30. A module assembly for treating gases generated by an electrolytic bath of an electrolysis cell, the module assembly comprising:
- a first collecting module fluidly connected to the electrolytic bath of the electrolytic cell and configured to collect primary process gases produced in the electrolytic cell, wherein the primary process gases consist essentially of hot and concentrated gases which are collected above the electrolytic bath before any dilution of the primary process gases with contained hoodspace air using orifices purposely made over the electrolytic bath of the electrolytic cell;
- a second collecting module fluidly connected to a hoodspace of the electrolytic cell and configured to collect hoodspace process gases produced in the electrolytic cell;
- a pre-treating module fluidly connected to the first collecting module and comprising a fluid bed reactor of fluorinated alumina, the pre-treating module being configured to drive the primary process gases through the fluid bed of fluorinated alumina to pre-treat the primary process gases with partially fluorinated alumina, the pre-treating module being located immediately aside to the electrolytic cell;
- a combining module fluidly connected to the pre-treating module and the second collecting module and configured to combine the hoodspace process gases with the primary process gases pre-treated in the pre-treating module;
- a scrubber module fluidly connected to the combining module and configured to contact the combined process gases with fresh alumina to form semi-scrubbed process gases and fluorinated alumina; and
- a filtering module fluidly connected to the scrubber module and configured to separate the semi-scrubbed process gases from the fluorinated alumina so as to obtain fluorinated alumina, the filtering module being further fluidly connected to the pre-treating module and configured to reinject, at least in part, the fluorinated alumina into the pre-treating module.

31. The module assembly according to claim 29, wherein the first collecting module and the pre-treating module are located within the electrolytic cell, the pre-treating module being also fluidly connected to the electrolytic cell and is further configured to inject at least a portion of the fluorinated alumina contained in the pre-treating module into the electrolytic cell as feedstock for production of aluminum.

32. The module assembly according to claim 30, further comprising an exhausting module located downstream the pre-treating module and upstream the combining module, and configured to exhaust the pre-treated primary process gases from an upper part of the fluid bed and to drive the pre-treated primary process gases toward the combining module.

33. The module assembly according to claim 32, further comprising a first buffering module located downstream the filtering module and upstream the pre-treating module, and configured to buffer at least a portion the fluorinated alumina before being injected into the pre-treating module.

34. The module assembly according to claim 33, further comprising a second buffering module located downstream the filtering module and upstream the electrolytic cell, and configured to buffer at least a portion the fluorinated alumina before being injected into the electrolytic cell as feedstock for production of aluminum.

35. The module assembly according to claim 34, wherein the first and second buffering modules are combined to form one buffering module fluidly connected to the pre-treating module and the electrolytic cell.

36. The module assembly according to claim 30, wherein the pre-treating module is also fluidly connected to the electrolytic cell and configured to inject at least a portion of the fluorinated alumina contained in the pre-treating module into the electrolytic cell as feedstock for production of aluminum.

37. The module assembly according to claim 30, wherein the scrubber module is also fluidly connected upstream to the filtering module, and configured to receive from the filtering module a portion of the fluorinated alumina.

38. The module assembly of claim 37, wherein the scrubber module is further configured to combine the portion of the fluorinated alumina with the fresh alumina.

39. The module assembly according to claim 30, further comprising a venting module fluidly connected to the filtering module and configured to vent to an environment scrubbed process gases and residual fluorides separated in the filtering module from the fluorinated alumina.

40. The module assembly according to claim 30, further comprising an alumina flow control module located upstream the pre-treating module for controlling a flow of the fluorinated alumina.

41. The module assembly according to claim 40, wherein the alumina flow control module comprises a discontinuously operating pneumatic conveying system, the flow of the fluorinated alumina being controlled by varying an operating time of the discontinuously operating pneumatic conveying system.

42. An electrolytic cell assembly for production of aluminum comprising:
- at least one electrolytic cell configured for producing aluminum; and
- at least one module assembly as defined in claim 33 for treating gases generated by the at least one electrolytic cell.

\* \* \* \* \*